No. 798,502. PATENTED AUG. 29, 1905.
W. T. EVANS.
COTTON SEED PLANTING MACHINE.
APPLICATION FILED FEB. 27, 1904.
3 SHEETS—SHEET 3.
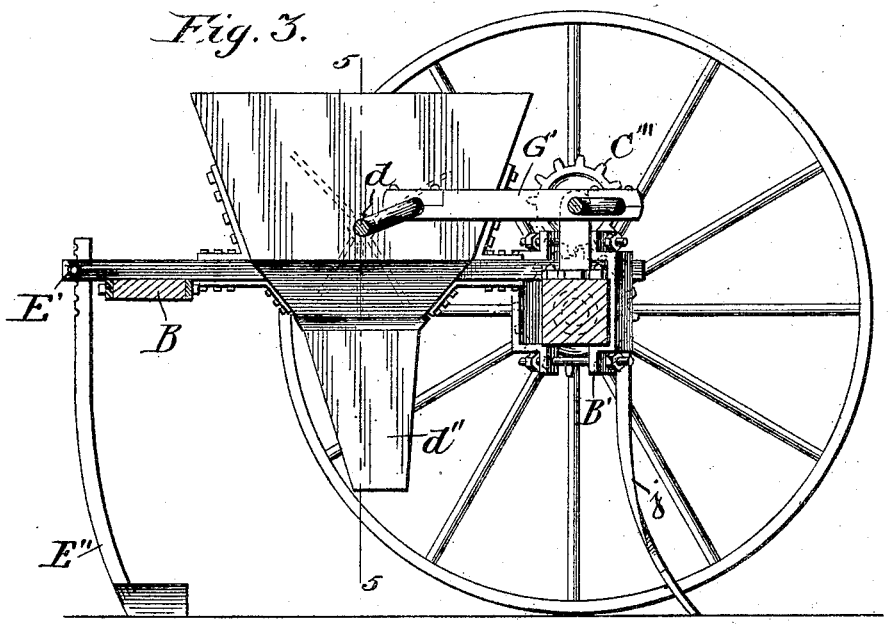
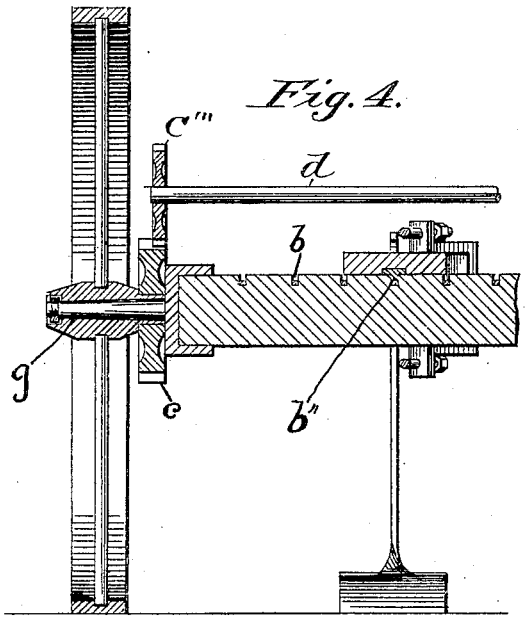
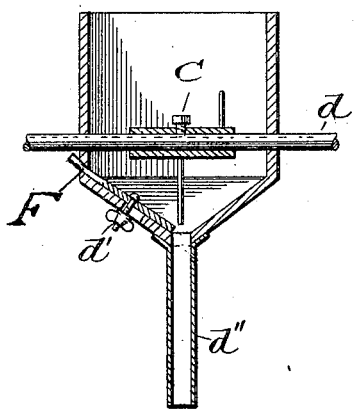
Witnesses:
R. E. Guthrie
John V. Koogle
Inventor:
William T. Evans

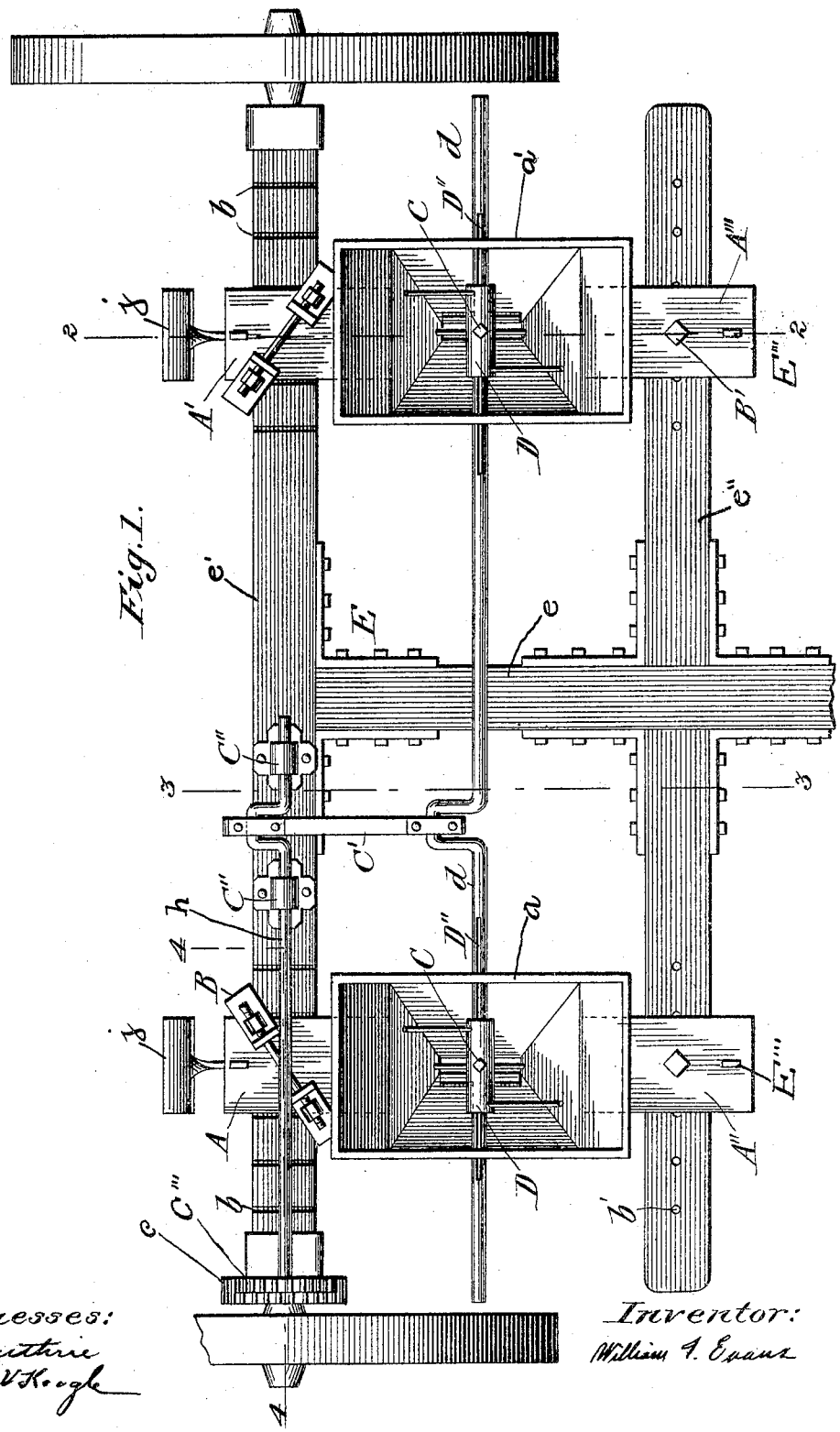

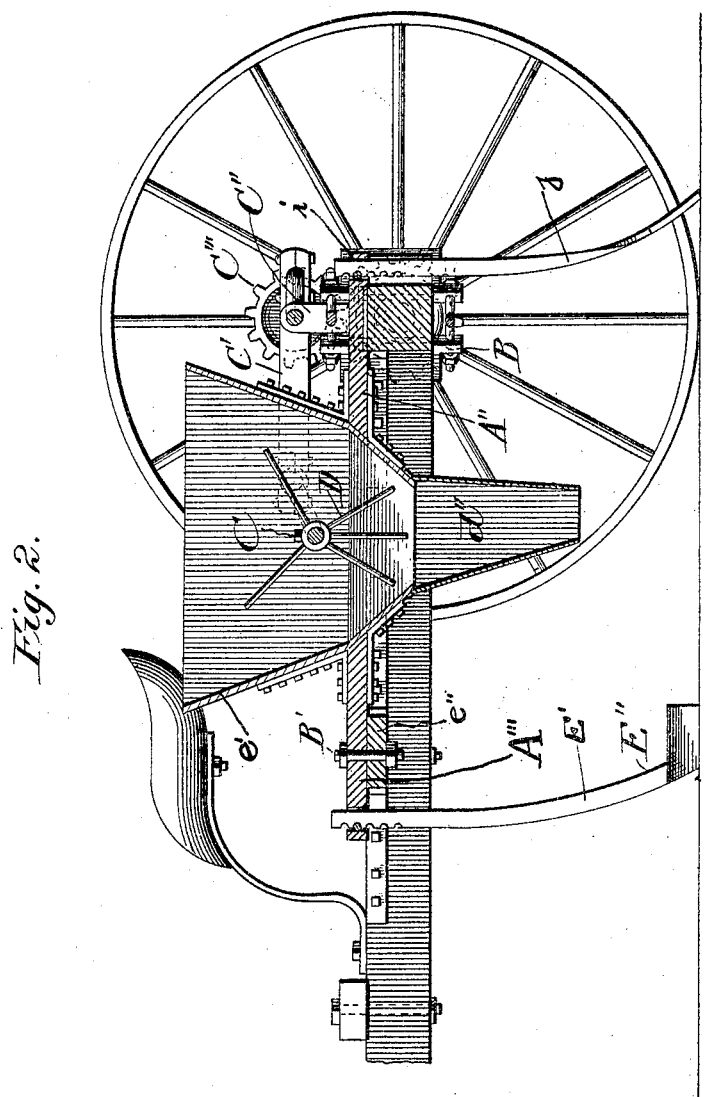

UNITED STATES PATENT OFFICE.

WILLIAM T. EVANS, OF ELRENO, OKLAHOMA TERRITORY.

COTTON-SEED-PLANTING MACHINE.

No. 798,502. Specification of Letters Patent. Patented Aug. 29, 1905.

Application filed February 27, 1904. Serial No. 195,699.

*To all whom it may concern:*

Be it known that I, WILLIAM T. EVANS, a citizen of the United States, residing at Elreno, in the county of Canadian, Territory of Oklahoma, have invented a new and useful Two-Horse Cotton-Seed Planter, of which the following is a specification.

My invention relates to a cotton-seed-planting machine.

The object of the invention is the provision of means for adjusting the seed-receptacles at various distances from one another and for planting seed simultaneously in a plurality of rows at the same operation.

The further object of the invention is the provision of means for insuring the planting of the seed in straight rows.

Another object of the invention is the provision of means for adjusting the agitators.

A still further object of the invention is the provision of means which are simple, durable, and inexpensive to manufacture.

I attain these and other objects by the mechanisms shown in the accompanying drawings, in which—

Figure 1 is a plan view of the machine. Fig. 2 is a longitudinal sectional view on the line 2 2 of Fig. 1. Fig. 3 is a sectional view on the line 3 3 of Fig. 1. Fig. 4 is a cross-section on the line 4 4 of Fig. 1, and Fig. 5 is a cross-sectional view on the line 5 5 of Fig. 3.

Reference is had to the accompanying drawings, forming part of the specification, in which like characters of reference indicate corresponding parts.

In the drawings the characters A A' and A'' A''' designate supports which extend in opposite directions, one end of which is secured to the seed-receptacles $a$ $a'$, which are provided with downwardly-extending spouts $d''$, the said seed-receptacles and spouts being of the usual construction—that is, having the flared upper body portion, the latter terminating in the spout $d''$ for forming a discharge-opening. The supports A A' and A'' A''' have their outer extremities adjustably secured and supported by the body-frame E, which includes a center beam $e$ and a transverse beam $e'$, secured thereto, and a beam $e''$ transversely arranged in parallelism therewith.

The beam $e'$ carries the wheel-axle $g$, at opposite ends thereof, of the usual construction. The upper face of the beam $e'$ is provided with a plurality of grooves $b$, suitably spaced from one another. The supports A A' are provided with downward projections $b''$, adapted to engage the grooves $b$ and be retained therein by a clamp B to hold the supports A A' in a fixed adjusted position on the beam $e'$. The beam $e''$ is provided with a plurality of openings $b'$, which are in alinement with the grooves $b$ in the beam $e'$ and are adapted to receive a pin B', carried by each of the supports A'' A''' for locking such supports in an adjusted fixed position on the beam $e''$. Said supports A'' A''' extend beyond the beam $e''$ and are provided with suitable openings E''' to receive the stem portion E' of a furrow-opener, which is capable of vertical adjustment in said openings E'''. Mounted upon the upper face of the beam $e'$ is a rotatable crank-shaft $h$, having bearings C'', and at the outer end of the same is a gear-wheel C''', which meshes with a gear-wheel $c$, secured to the wheel of the machine. Between the bearings C'' and at the crank portion of the shaft is a link C', one end of which is movably connected to the crank and the other end connected to the crank of another shaft $d$, the latter provided near its ends with grooves constituting keyways D'', longitudinally arranged therein. The shaft $d$ passes through the body portion of the seed-receptacles $a$ $a'$ and has mounted on the grooved portions thereof agitators D, which are adjustably connected thereto by set-pins C engaging the grooves D''. The supports A A' are provided with openings $i$ to receive furrow-coverers $j$, which are in alinement with the furrow-openers E''. The furrow-coverers are capable of ordinary adjustment in the openings $i$. It will be apparent that the furrow-openers E'' are also vertically adjustable in the openings E'''.

When the machine is in operation and on forward movement thereof, the wheel causes the gear $c$ to rotate which is in mesh with the gear C''' and which imparts rotary motion thereto. The latter, through the medium of the shaft $h$ and the link C', actuates the shaft $d$ to cause the same to revolve, thereby imparting movement to the agitators D within the seed-receptacles $a$ $a'$ to cause the seed contained within the same to be positively fed through the spout $d''$ to the ground as the machine travels, thus distributing evenly in rows the seed contained in the receptacles $a$ $a'$.

It will be apparent that by adjusting the supports A A' and A'' A''' longitudinally on the beams $e'$ and $e''$ or laterally of the machine the seed is caused to be distributed in rows on the ground at various distances from one another.

In Fig. 5 I have disclosed a cut-off for the spout $d''$ of the receptacles $a\ a'$, which consists of a slide F, which is locked to the said hopper in an open, medium, or closed position by a set-screw $d'$, so as to regulate the quantity of the seed in the receptacles $a\ a'$ to be fed therefrom or to wholly cut off the discharge.

It may be understood that I may make such variations and modifications as come properly within the scope of the claims hereunto appended if found desirable, or I may utilize the machine without any change in its construction for distributing materials other than seed.

Having thus described my invention, what is claimed as new is—

1. In a machine of the class described, a main frame, hoppers having brackets adjustably supported by said frame, furrow openers and covers mounted on said brackets and movable with respect to the same, a rotatable shaft passing entirely through the hoppers, agitators on the shaft, and means for imparting motion to the latter.

2. In a machine of the class described, a main frame, hoppers, brackets connected to the latter and adjustably supported on the said frame, vertical-adjustable furrow-openers, and covers carried by said brackets and movable therewith, adjustable rotatable agitators supported in said hoppers, and means for imparting motion to said agitators.

3. In a machine of the class described, a main frame composed of a central beam and transverse beams arranged in parallelism with one another, a plurality of hoppers having supports mounted on said transverse beams and adjustably connected thereto, a rotary shaft solely supported by the hoppers and passing entirely through the same, agitators on said shaft, and means for actuating the shaft.

4. In a machine of the class described, a main frame composed of a central beam and transverse beams arranged in parallelism with one another, a plurality of hoppers having supports mounted on said transverse beams and adjustably connected thereto, a rotary shaft solely supported by the hopper and passing entirely through the same, adjustable agitators on said shaft, and means for actuating the shaft.

5. In a machine of the class described, a main frame composed of a central beam and transverse beams arranged in parallelism with one another, a plurality of hoppers having supports mounted on said transverse beams and adjustably connected thereto, a rotary shaft solely supported by the hopper and passing entirely through the same, adjustable agitators on said shaft, vertical adjustable furrow-openers and covers movable with said supports, and means for actuating the shaft.

In witness whereof I have hereunto set my hand in the presence of two witnesses.

WILLIAM T. EVANS.

Witnesses:
  CHAS. C. KNEISLY,
  FRED. E. MCKINLEY.